(12) United States Patent
Ceccarelli et al.

(10) Patent No.: US 7,275,753 B1
(45) Date of Patent: Oct. 2, 2007

(54) TOWING DOLLY CRADLE ASSEMBLY

(75) Inventors: Charles J. Ceccarelli, Mountain Home, ID (US); Kevin B. Haight, Boise, ID (US)

(73) Assignee: Rimco, Inc., Mountain Home, ID (US)

( * ) Notice: Subject to any disclaimer, the term of this patent is extended or adjusted under 35 U.S.C. 154(b) by 0 days.

(21) Appl. No.: 11/413,441

(22) Filed: Apr. 28, 2006

(51) Int. Cl.
*B60B 29/00* (2006.01)

(52) U.S. Cl. ............... 280/79.4; 280/43.21; 414/428; 414/427; 414/426

(58) Field of Classification Search ............. 280/79.4, 280/43.21, 402; 414/426, 427, 428, 429, 414/430, 563, 589, 590; 254/3 R, 8 R, DIG. 12
See application file for complete search history.

(56) References Cited

U.S. PATENT DOCUMENTS

| | | | |
|---|---|---|---|
| 4,664,399 A | | 5/1987 | Mobley et al. |
| 4,696,484 A | * | 9/1987 | Casey ..................... 280/43.16 |
| 4,846,484 A | | 7/1989 | Nekola |
| 4,900,215 A | * | 2/1990 | Nowell ....................... 414/428 |
| 5,049,025 A | * | 9/1991 | Roman ....................... 414/429 |
| 5,620,192 A | * | 4/1997 | Demongin ................... 280/35 |
| 5,732,960 A | * | 3/1998 | Elam ......................... 280/79.4 |
| 5,941,675 A | * | 8/1999 | Orr ............................. 414/428 |
| 6,095,746 A | * | 8/2000 | Bergin ........................ 414/430 |
| 6,860,496 B2 | * | 3/2005 | Novak et al. ............. 280/79.11 |
| 7,097,406 B1 | * | 8/2006 | Gang .......................... 414/429 |
| 2003/0038439 A1 | * | 2/2003 | Novak et al. .............. 280/79.7 |
| 2005/0017470 A1 | * | 1/2005 | Abbott ...................... 280/79.4 |

OTHER PUBLICATIONS

Unknown Author, Granger Dolly (?) [Printout of IMG_ 0556.jpg opened and printed as a pdf file (1 page)], 00/00/1993-2001 (?), Publisher: Unknown.

Unknown Author, Granger Dolly (?) [Printout of IMG_ 0558.jpg opened and printed as a pdf file (1 page)], 00/00/1993-2001 (?), Publisher: Unknown.

Unknown Author, Self Loading Wrecker Dolly Owners Manual Model WD 5400, (4 pages), 00/00/1993-1999 (?), Publisher: Diversified Products Mfg. (?), Jacksonville, Florida (?).

* cited by examiner

*Primary Examiner*—J. A Shriver
(74) *Attorney, Agent, or Firm*—Charles R. Clark

(57) ABSTRACT

During recovery of a disabled motor vehicle, a towing dolly cradle assembly can be used to raise and carry an end of the vehicle. The towing dolly cradle assembly comprises two towing dolly assemblies spaced apart parallel to one another and with each dolly assembly having a horizontal main tube and each dolly assembly attached respectively along one of its longitudinal sides to an end of each of the two dolly axle assemblies interposed perpendicularly between the two dolly assemblies. The attachment of the two dolly assemblies to the two axle assemblies forms a generally rectangular towing dolly cradle assembly.

In each dolly assembly, two pivot mounting assemblies are attached to the main tube with one mounting assembly at or near each end of the tube. Each mounting assembly has a spindle and a wheel assembly mounted to the spindle on the longitudinal side of the tube away from the interposed and attached dolly axle assemblies. Each mounting assembly can be actuated to raise an associated end of the horizontal tube to a raised position by the application of a torque force to a dolly lever removably attached to the mounting assembly and the dolly assembly can be locked in the raised position by actuation of a camlock having a camlock engaging pin from an open condition to a closed condition with the engaging pin protruding into a cooperating receiving hole of the pivot mounting assembly.

10 Claims, 7 Drawing Sheets

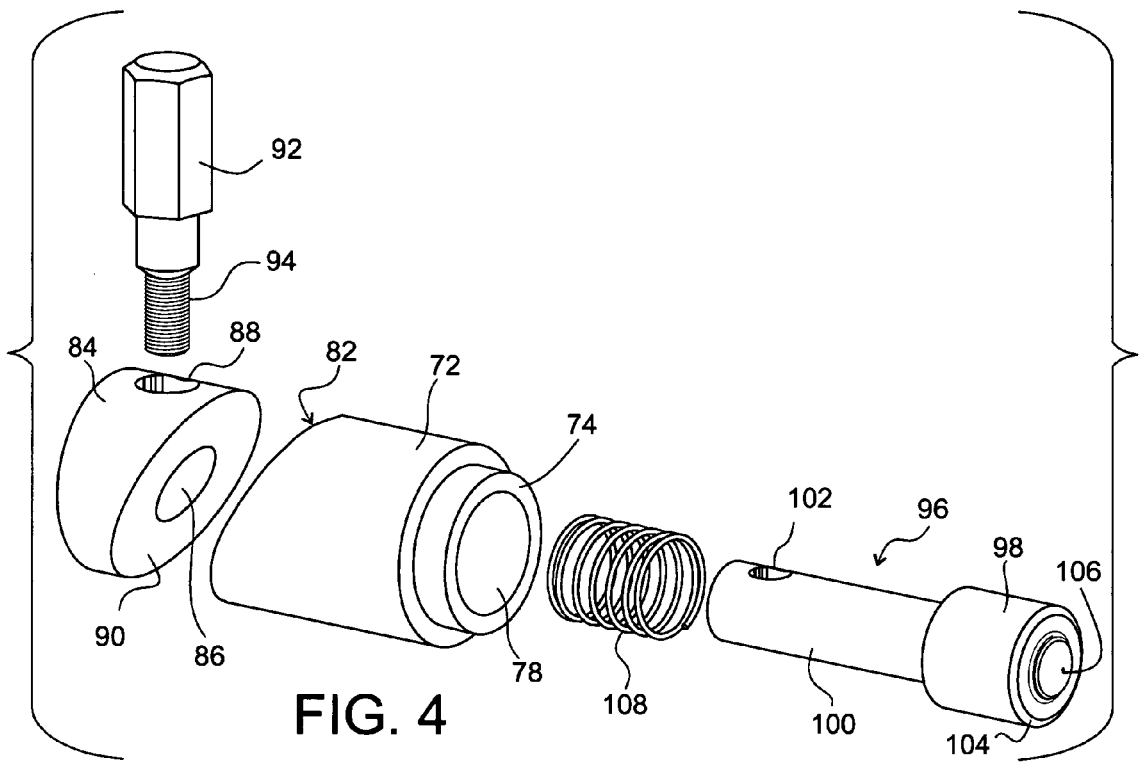
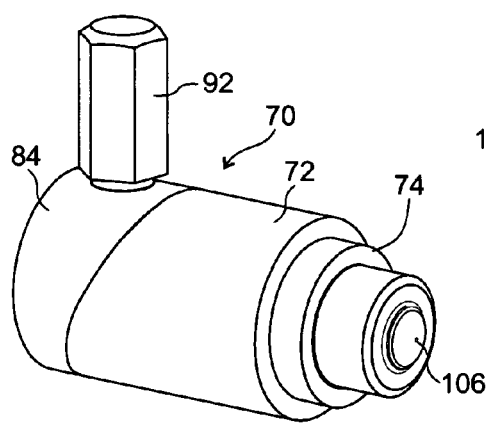
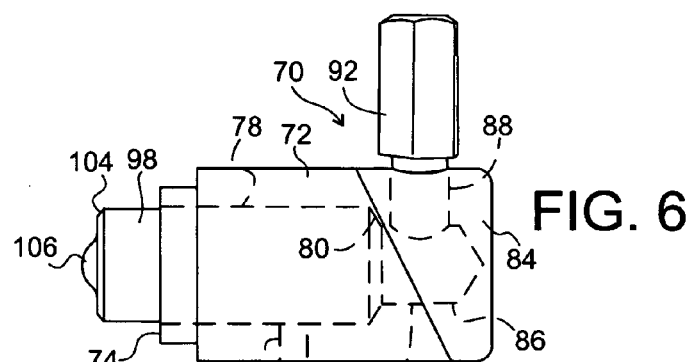
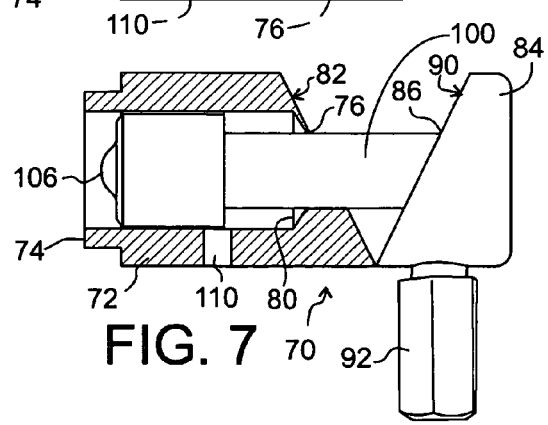

US 7,275,753 B1

TOWING DOLLY CRADLE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

The present invention relates to a novel towing dolly cradle assembly useful in the recovery of disabled vehicles by a tow vehicle.

Preferably, the towing dolly cradle assembly comprises a pair of towing dolly assemblies interconnected by a pair of interposed dolly axle assemblies into a rectangular frame having two dolly wheel assemblies mounted outboard on each towing dolly assembly from the inboard attached dolly axle assemblies. Generally, the two towing dolly assemblies are used to raise the inboard attached two dolly axle assemblies from near or at the plane of the ground surface beneath the towing dolly cradle assembly to a raised position (a higher plane) along with an end of a disabled vehicle located above the dolly axle assemblies. When used for raising the end of a disabled vehicle, the dolly axle assemblies are placed to closely bracket from below, from in front, and from behind a pair of coaxial wheels at one end of the disabled vehicle with the dolly axle assemblies generally aligned across the longitudinal axis of the vehicle and making contact with portions of the forward and rearward, lower surfaces of the pair of coaxial wheels of the disabled vehicle embraced from below by the dolly axle assemblies.

The towing dolly cradle assembly is designed to permit the raising of one end of a disabled vehicle and to transport the raised vehicle in-line behind a tow vehicle to a place of safe haven for placement on a vehicle carrier, to a place for repair, or to a vehicle storage location.

BRIEF SUMMARY OF THE INVENTION

The present invention relates to a novel towing dolly cradle assembly comprising two novel towing dolly assemblies each attached parallel to one another to respective ends of two interposed dolly axle assemblies. An objective of this invention, a towing dolly cradle assembly, is to incorporate two improved towing dolly assemblies making the cradle assembly more useful for raising a disabled vehicle embraced by the dolly axle assemblies of the towing dolly cradle assembly to a raised position for transport. A further object of the invention is to provide an improved locking mechanism for locking each towing dolly assembly in the raised position for transport.

Another objective of the invention is to provide a towing dolly assembly having a locking camlock that is easier and more convenient for a tow vehicle operator to use in raising, towing, and lowering a disabled vehicle. A further object is to provide a towing dolly assembly that is easier to manipulate into an appropriate position as part of a towing dolly cradle assembly.

Ergonometric advantages for a tow vehicle operator are promoted because with the instant invention, each towing dolly assembly is light in weight and each wheel assembly incorporated into each dolly assembly can be temporarily held in a detent position located between a storage position and a raised position, thereby easing the moving and placing of each dolly assembly in relationship across respectively an end of each of the two interposed dolly axle assemblies.

When the wheel assemblies are held in the detent position, the towing dolly assembly becomes a more stable unit during moving and during joining of each dolly assembly to respective ends of the two dolly axle assemblies.

Preferably, the detent position is maintained by a camlock compression spring biasing a camlock engaging pin detent nub into close cooperating contact within a detent position hole of a pivot mounting assembly and the spring pressure resiliently maintaining the cooperating contact and thus holding a respective pivot mounting assembly in a more stable condition and helping a tow vehicle operator safeguard his back and body from injury that in the absence of the detent position might be caused by undesired shifting of the dolly assembly and an incorporated wheel assembly while the operator adjusts the physical location of a towing dolly assembly in relationship to a dolly axle assembly and to a disabled vehicle.

The towing dolly cradle assembly can be made from structural steel tubes, steel plate, and steel rod stock together with appropriate mechanical fittings such as camlocks, snap buttons, bolts, nuts, washers, bearings, bushings, pins, zerk grease fittings, and wheel assemblies. Other suitable materials including aluminum tubes and aluminum plate could be substituted in place of corresponding steel tubes and steel plate without departing from the intended scope of the invention.

Additional and various other objects and advantages attained by the invention will become more apparent as the specification is read and the accompanying figures are reviewed.

BRIEF DESCRIPTION OF THE SEVERAL VIEWS OF THE DRAWINGS

FIG. 4 is a perspective exploded view of a camlock assembly 70, 71;

FIG. 5 is a perspective view of a camlock assembly 70, 71 in a closed condition;

FIG. 6 is a side view of a camlock assembly 70, 71 in a closed condition;

FIG. 7 is a partial cross-sectional side view of a camlock assembly 70, 71 in an open condition resulting from a rotation of a camlock cap 84 approximately 180 degrees from the closed condition and the interaction of cooperating angled faces 82 and 90 of the camlock assembly and showing a camlock engaging pin 96 fully translated laterally and inwardly within the camlock assembly and for purposes of clear illustration of the position of the camlock engaging pin not showing a camlock compression spring 108;

DETAILED DESCRIPTION OF THE INVENTION

Figure 1:
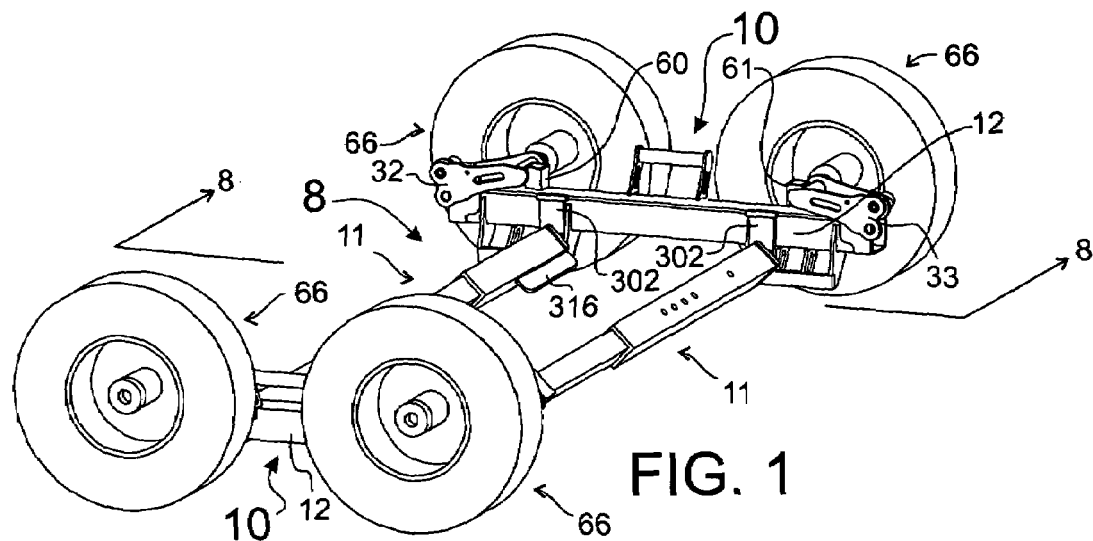
FIG. 1 is a perspective view of a towing dolly cradle assembly 8 with each pivot mounting assembly 20, 21 in a storage position.

Referring to FIGS. 1 through 21, a tow vehicle can be equipped with an unassembled towing dolly cradle assembly 8 having two towing dolly assemblies 10 and two dolly axle assemblies 11 that can be reassembled into the towing dolly cradle assembly at a recovery site for the recovery of a disabled vehicle.

The towing dolly cradle assembly 8 comprises two towing dolly assemblies 10 that are spaced parallel apart and opposite one another and parallel and reversably joined together by two interposed dolly axle assemblies 11 that are spaced parallel apart and opposite one another and parallel with the longitudinal axis of the dolly assemblies perpendicular to the longitudinal axis of the axle assemblies.

Each towing dolly assembly 10 has a horizontal main tube 12 and each main tube has a left end 14 and a right end 16 and has a left pivot mounting assembly 20 attached at or near the left end and has a right mounting assembly 21 attached at or near the right end.

Each towing dolly assembly 10 has two wheel assemblies 66 mounted operatively outboard of one longitudinal side of the main tube and two axle cradle assemblies 120 spaced apart and attached along the opposite parallel longitudinal side of the main tube between respectively the left ends and the right ends. In the assembled towing dolly cradle assembly 8, the dolly assemblies 10 are spaced apart parallel and facing opposite one another with the axle cradle assemblies facing one another.

The towing dolly cradle assembly 8 further has two dolly axle assemblies 11 spaced parallel apart and opposite one another, and each axle assembly having a central assembly, the central assembly having two opposite axle ends, each axle end having an axle end attachment tab 302, the axle assemblies interposed perpendicularly between the dolly assemblies 10 and having respective said axle end attachment tabs selectively and removably attached to respective axle cradle assemblies 120 of respective dolly assemblies.

To reassemble an operative towing dolly cradle assembly 8, each axle end attachment tab 302 of the two dolly axle assemblies 11 of an unassembled towing dolly cradle assembly is reversably attached to a selected axle cradle assembly 120 by insertion from above of the respective tab into close physical engagement in a selected receiving opening of the selected axle cradle assembly. See FIG. 21.

Each pivot mounting assembly 20, 21 is an articulated mechanism incorporating elements that pivot respectively about the axis of an incorporated pivot pin 64, 65.

The left pivot mounting assembly 20 comprises a left camlock assembly 70, the left camlock assembly having a camlock engaging pin 96, a left camlock weldment 22 is attached by welding to one longitudinal, vertical side of the main tube 12 proximate the left end 14, the left camlock weldment having a left camlock weldment pivot pin bore 24 spaced from and parallel to a left camlock mounting bore 26, the left camlock assembly mounted preferably by welding to the left camlock weldment above and transversely across the main tube with the camlock engaging pin coaxial to the left camlock mounting bore and selectively moveable in, through, and outward beyond the left camlock mounting bore, a left pivot weldment 28, the left pivot weldment spaced parallel and across the main tube from the left camlock weldment and attached by welding to the opposite longitudinal side of the main tube, and the left pivot weldment having a left pivot weldment pivot pin bore 30 coaxial to the left camlock weldment pivot pin bore, a left pivot pin 64 having two extending ends, the left pivot pin extending coaxially through the left camlock weldment pivot pin bore and extending transversely and perpendicularly across the longitudinal axis of the main tube and extending coaxially through the left pivot weldment pivot pin bore, the left pivot pin rotatably retained within the left camlock weldment pivot pin bore and the left pivot weldment pivot pin bore, a left pivot lock arm 32 attached perpendicularly by welding to a first extending end of the left pivot pin adjacent to the left camlock weldment, a left pivot arm 50 attached perpendicularly by welding to a second extending end of the left pivot pin adjacent to the left pivot weldment, the left pivot arm having a left spindle mounting hole 54 spaced from and parallel to the left pivot pin, a wheel spindle 56 attached at one end perpendicularly by welding to the left pivot lock arm and spaced from and parallel to the left pivot pin at a distance sufficient to allow the left spindle to swing about the left pivot pin in an arc beyond the left end and beneath the main tube, and the wheel spindle mounted by welding to the left pivot arm in and through the left spindle mounting hole and the wheel spindle having a wheel spindle stub axle portion 59 extending outwardly and perpendicularly beyond the left pivot arm and away from the main tube and parallel to the left pivot pin, and the left pivot lock arm having a left raised position receiving hole 44 transverse through the left pivot lock arm spaced from and parallel to the left pivot pin and located through the left pivot arm in a position that selectively and coaxially aligns with the camlock engaging pin to selectively engage the left raised position receiving hole when the left wheel spindle is located below the main tube and approximately 18 degrees over center towards the longitudinal midpoint of the underside of the main tube, the raised position receiving hole sized to selectively and coaxially receive the camlock engaging pin of the left camlock assembly, and a left dolly pivot lever anchor 60 attached by welding to the wheel spindle and located between the left pivot lock arm and the left pivot arm.

The right pivot mounting assembly 21 comprises a right camlock assembly 71, the right camlock assembly having a camlock engaging pin 96, a right camlock weldment 23 attached by welding to the same longitudinal, vertical side of the main tube 12 as attached to the left camlock weldment 22, and the right camlock weldment attached proximate the right end 16, the right camlock weldment having a right camlock weldment pivot pin bore 25 spaced from and parallel to a right camlock mounting bore 27, the right camlock assembly mounted preferably by welding to the right camlock weldment above and transversely across the main tube with the camlock engaging pin coaxial to the right camlock mounting bore and selectively moveable in, through, and outward beyond the right camlock mounting bore, a right, pivot weldment 29, the right pivot weldment spaced parallel and across the main tube from the right camlock weldment and attached by welding to the opposite longitudinal side of the main tube, and the right pivot weldment having a right pivot weldment pivot pin bore 31 coaxial to the right camlock weldment pivot pin bore, a right pivot pin 65 having two extending ends, the right pivot pin extending coaxially through the right camlock weldment pivot pin bore and extending transversely and perpendicularly across the longitudinal axis of the main tube and extending coaxially through the right pivot weldment pivot pin bore, the right pivot pin rotatably retained within the right camlock weldment pivot pin bore and the right pivot weldment pivot pin bore, a right pivot lock arm 33 attached perpendicularly by welding to a first extending end of the right pivot pin adjacent to the right camlock weldment, a right pivot arm 51 attached perpendicularly by welding to a second extending end of the right pivot pin adjacent to the right pivot weldment, the right pivot arm having a right spindle mounting hole 55 spaced from and parallel to the right pivot pin, a wheel spindle 56 attached at one end perpendicularly by welding to the right pivot lock arm and spaced from and parallel to the right pivot pin at a distance sufficient to allow the right spindle to swing about the right pivot pin in an arc beyond the right end and beneath the main tube, and the wheel spindle mounted by welding to the right pivot arm in and through the right spindle mounting hole and the wheel spindle having a wheel spindle stub axle portion 59 extending outwardly and perpendicularly beyond the right pivot arm and away from the main tube and parallel to the right pivot pin, and the right pivot lock arm having a right raised position receiving hole 45 transverse through the right pivot lock arm spaced from and parallel to the right pivot pin and located through the right pivot arm in a position that selectively and coaxially aligns with the camlock engaging pin to selectively engage the right raised position receiving hole when the right wheel spindle is located below the main tube and approximately 18 degrees over center towards the longitudinal midpoint of the underside of the main tube, the raised position receiving hole sized to selectively and coaxially receive the camlock engaging pin of the right camlock assembly, and a right dolly pivot lever anchor 61 attached by welding to the wheel spindle and located between the right pivot lock arm and the right pivot arm.

The towing dolly assembly 10 further comprises two wheel assemblies 66 with one wheel assembly mounted to and rotatably retained on each spindle stub axle portion. Preferably each wheel assembly 66 is retained on its respective spindle stub axle portion by use of a castellated nut and cotter pin (not shown).

Preferably, the left pivot lock arm 32 has a left detent position receiving hole 42 spaced from the left pivot pin 64 at the same distance as the left raised position receiving hole 44 and spaced angularly around the axis of the left pivot pin away from the left raised position receiving hole and the right pivot lock arm 33 has a right detent position receiving hole 43 spaced from the right pivot pin 65 at the same distance as the right raised position receiving hole 45 and spaced angularly around the axis of the right pivot pin away from the right raised position receiving hole, and each camlock engaging pin 96 further has a camlock engaging pin nub 106 on the outer end of the camlock engaging pin sized to be resiliently received in the detent position receiving hole of a respective pivot lock arm when the respective detent position receiving hole is aligned with the respective engaging pin nub.

Preferably, the left pivot lock arm 32 further has a left storage position receiving hole 40 transverse through the left pivot lock arm and located through the left pivot lock arm in a position that coaxially aligns with the left camlock engaging pin to selectively engage the left storage position receiving hole when the left wheel spindle is located above and near the upper side of the main tube, and the storage position receiving hole is sized to selectively and coaxially receive the camlock engaging pin of the left camlock, and the right pivot lock arm 33 further has a right storage position receiving hole 41 transverse through the right pivot lock arm and located through the right pivot lock arm in a position that coaxially aligns with the right camlock engaging pin to selectively engage the right storage position receiving hole when the right wheel spindle is located above and near the upper side of the main tube, and the storage position receiving hole is sized to selectively and coaxially receive the camlock engaging pin 96 of the right camlock 71.

Each dolly axle assembly 11 comprises a central assembly with the central assembly having two outer ends and each outer end is attached to an axle end attachment tab 302 or each outer end is formed into an integrated axle end attachment tab.

The preferred embodiment of the central assembly is a telescoping axle tube assembly. An alternative central assembly comprises a fixed length tube having an axle end attachment tab at each end.

FIGS. 1, 10, 13, 14, 17, 18, 19, 20, and 21, show the preferred embodiment of the dolly axle assembly 11. The preferred dolly axle assembly 11 includes two end cap assemblies 300, see FIGS. 17, 18, and 19. Preferably, each end cap assembly 300 comprises an axle end attachment tab 302 attached by welding to an axle end spacer 306, the end spacer attached by welding to an axle end plate 310, and the end plate attached by welding to an axle end plug 312.

In the preferred embodiment, the dolly axle assembly 11 has an axle end attachment tab 302 attached to an axle end spacer 306, the end spacer attached to an axle end plate 310, the end plate attached to an axle end plug 312, the plug inserted into and attached to one end of a first outer axle tube 314, a portion of an inner axle tube 318 inserted within and attached to the first outer axle tube, the inner axle tube having a snap button mounting bore 320 through one wall preferably near its free end away from the first outer tube and the inner tube having a snap button 322 having a main body having two free ends, and having a snap button engagement nub 323 attached to one free end of the main body, the snap button engagement nub operatively seated in the snap button mounting bore with the engagement nub biased under spring pressure from a preflexed main body of the snap button arising from the seating process and the engagement nub extending through the wall of the inner tube, a second outer axle tube 324 adjustably received over the free end of the inner tube, the second outer axle tube having a closed position snap button receiving bore 326 and preferably a plurality of snap button receiving bores 328, 330, 332, 334 located along a wall of the second outer tube to operatively and selectively receive and releasably secure the second outer tube to the inner tube, the second outer tube attached at its end away from the inner tube to a second axle end plug, the second end plug attached to a second axle end plate, the second axle end plate attached to a second axle end spacer, and the second end spacer attached to a second axle end attachment tab.

In the preferred telescoping axle tube assembly, the axle end spacer 306 is T-shaped, the snap button 322 has a V-shaped main body, the main body is made of spring steel, and the main body is flexed to store spring pressure in the main body before the snap button engagement nub 323 is seated in the snap button receiving bore 326. One or more towed vehicle wheel tread pads 316 can be attached along the outer surfaces of the outer axle tubes.

An alternative central assembly is a fixed length tube having two ends and having attached to each end an axle end attachment tab 302.

Figure 3:
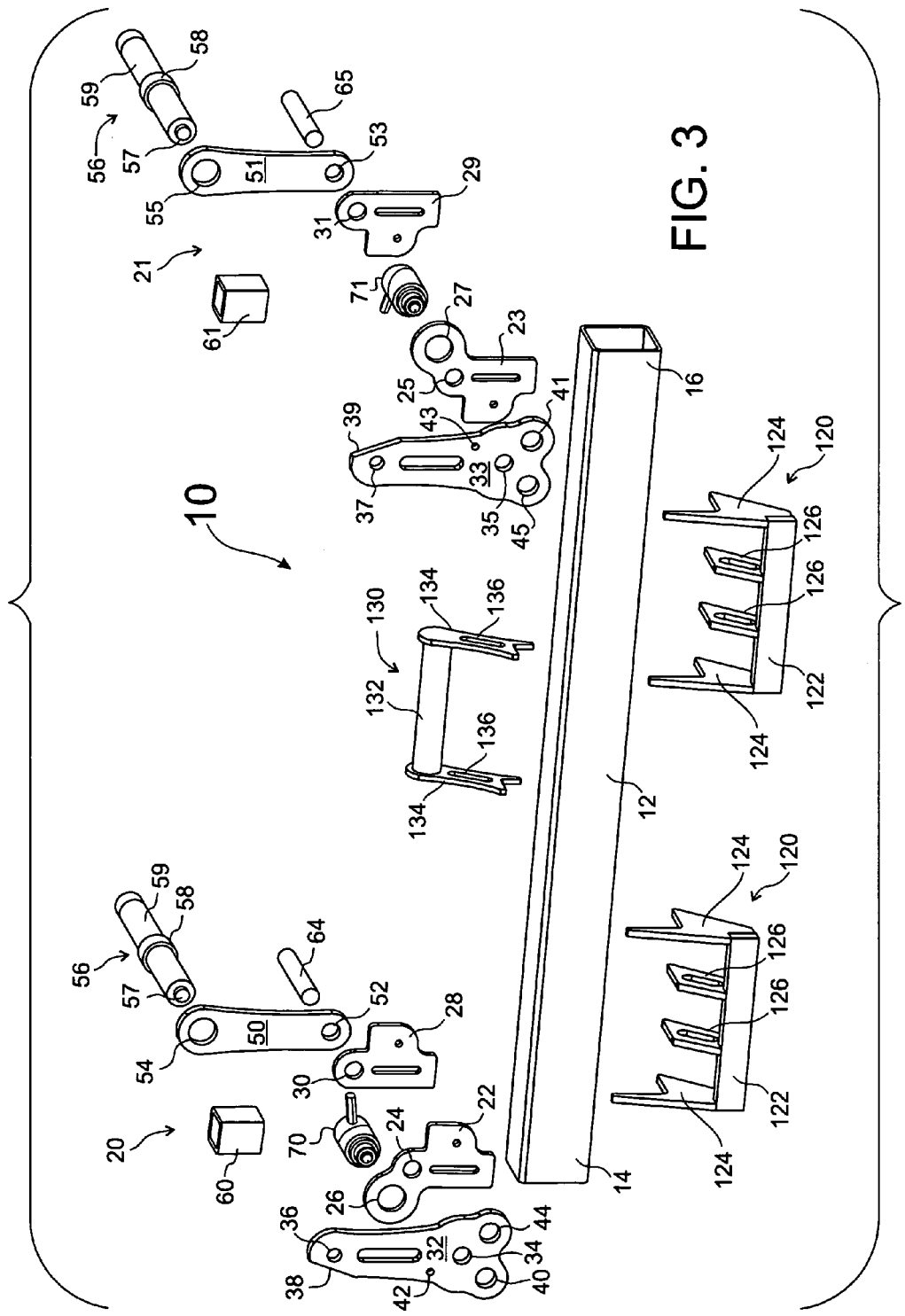
FIG. 3 is a perspective exploded view of a towing dolly assembly 10.
Figure 8:
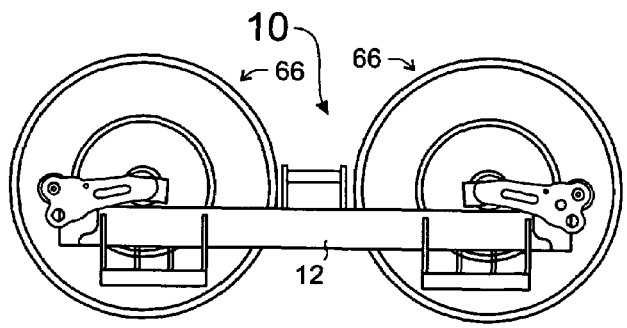
FIG. 8 is a side view of the towing dolly cradle assembly 8, along the view line 8-8 shown in FIG. 1, with the two dolly axle assemblies removed from the view, showing each pivot mounting assembly 20, 21 in a storage position.
Figure 9:
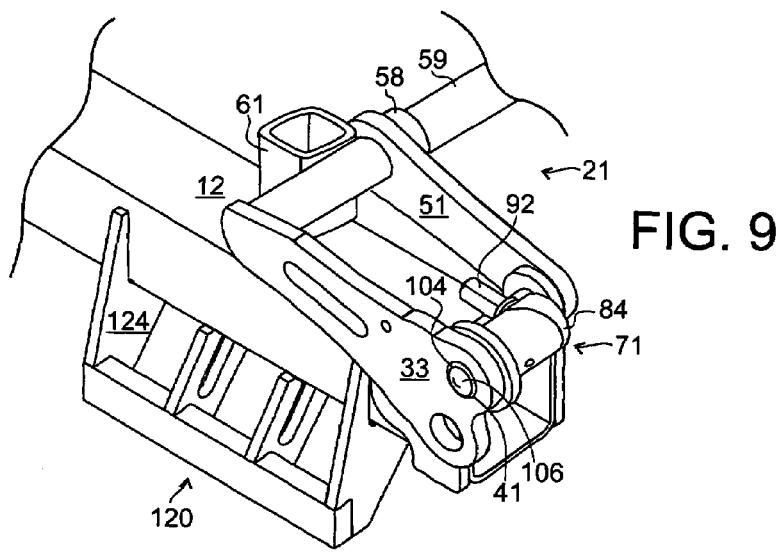
FIG. 9 is a partial perspective view of a towing dolly assembly 10 from above showing the right pivot mounting assembly 21 in a storage position and showing a camlock 71 in a closed condition with a camlock engaging pin detent nub 106 protruding into and engaging a right storage position receiving hole 41 of a wheel pivot lock arm 33.

Referring to FIG. 3, preferably, the left pivot lock arm 32 has a left pivot pin mounting hole 34 to receive the first extending end of the left pivot pin 64 and a left spindle mounting hole 36 to receive a wheel spindle mounting nub 57 to facilitate attachment of the left pivot lock arm to the respective left pivot pin and the wheel spindle each by welding; and the left pivot lock arm has a left pivot lock arm contact portion 38 that in the locked raised position preferably rests against the leftmost portion of the closer axle cradle assembly 120.

Referring to FIG. 3, preferably, the right pivot lock arm 33 has a right pivot pin mounting hole 35 to receive the first extending end of the right pivot pin 65 and a left spindle mounting hole 37 to receive a wheel spindle mounting nub 57 to facilitate attachment of the right pivot lock arm to the respective right pivot pin and the wheel spindle each by welding; and the right pivot lock arm has a right pivot lock arm contact portion 39 that in the locked raised position preferably rests against the rightmost portion of the closer axle cradle assembly 120.

Preferably, the left pivot arm 50 has a left pivot pin mounting hole 52 to facilitate attachment by welding of the left pivot arm to the left pivot pin 64.

Preferably, the right pivot arm 51 has a right pivot pin mounting hole 53 to facilitate the attachment by welding of the right pivot arm to the right pivot pin 65.

Preferably each wheel spindle 56 has a wheel spindle mounting nub 57 at one end and a wheel spindle annular shoulder 58 between the mounting nub and a wheel spindle stub axle portion 59 at the other end; and the stub axle portion is threaded and has a cotter pin cross bore at the outer end of the spindle to receive a castellated nut and associated cotter pin (nut and cotter pin not shown).

FIGS. 4, 5, 6, and 7 illustrate a preferred camlock assembly 70, 71. Each camlock assembly 70, 71 has a selectively moveable and rotatable camlock engaging pin 96, the camlock engaging pin has a camlock engaging pin nose portion 98 at one end and a smaller diameter camlock engaging pin shaft portion 100 at the other end, the nose portion preferably has a chamfered outer edge 104 and a rounded and contoured camlock engaging pin detent nub 106 at the outer face of the nose portion away from the pin shaft portion, the engaging pin shaft portion near its outer end has a transverse hex pin shaft mounting bore 102 preferably threaded, a camlock outer body 72, the outer body having an outer body mounting end 74 sized to be received respectively into a camlock mounting bore 26, 27 at one end, and an outer body cooperating angled face 82 at the other end, the outer body having an outer body camlock engaging pin shaft receiving through bore 76 sized to closely and slidingly and rotatably receive the engaging pin shaft portion extending in from the outer body mounting end, an outer body camlock engaging pin main receiving bore 78 coaxial to the shaft receiving through bore with the main receiving bore starting from the outer body mounting end and ending near the outer body cooperating angled face, the outer body having an interior annular shoulder 80 formed coaxially between the smaller diameter receiving through bore and the larger diameter main receiving bore and interior to the body and preferably near the outer body cooperating face, the main receiving bore is sized to closely and slidingly and rotatably receive the engaging pin nose portion and coaxial to the shaft receiving through bore, a camlock cap 84 having a cap pin shaft receiving bore 86 sized to receive and retain the end of the engaging pin shaft portion, the camlock cap having a hex pin mounting bore 88 perpendicular to and intersecting the cap pin shaft receiving bore, the hex pin mounting bore sized to receive a threaded end 94 of a hex pin 92, the threaded end engaging the hex pin shaft mounting bore within the hex pin mounting bore, the camlock cap having a cap cooperating angled face 90 shaped to closely interact with the adjacent outer body cooperating face, and a camlock compression spring 108 retained around the pin shaft portion and sandwiched between the pin nose portion 98 and the annular shoulder 80.

The compression spring 108 in an assembled camlock assembly 70, 71 encircles the engaging pin shaft portion 100 and is sandwiched between the pin nose portion 98 and the annular shoulder 80 and the spring is sized to bias the camlock assembly to a closed condition with the camlock engaging pin 96 extending out beyond the outer body 72 and to bias the outer body cooperating angled face 82 and the cap cooperating angled face 90 together Referring to FIGS. 4, 5, and 6, in a closed condition, the engaging pin 96 is biased outwardly by the compression spring 108 and extends out and beyond the outer body mounting end 74, the outer body cooperating angled face 82 and the cap cooperating angled face 90 are closely abutting and closely adjacent to one another.

Referring to FIG. 7, the camlock engaging pin 96 can be drawn into the camlock assembly 70, 71, by rotating the camlock cap 84 relative to the outer body 72 by the application of torsional force applied to the hex pin 92. As the camlock cap 84 rotates, the angled faces 82 and 90 act as cooperating wedges upon one another and retract the camlock engaging pin 96 inward and into the outer body 72.

FIGS. 6 and 7 show a zerk grease fitting mounting bore 110 for a zerk fitting (the zerk fitting not shown) for lubrication of the camlock assembly.

Figure 2:
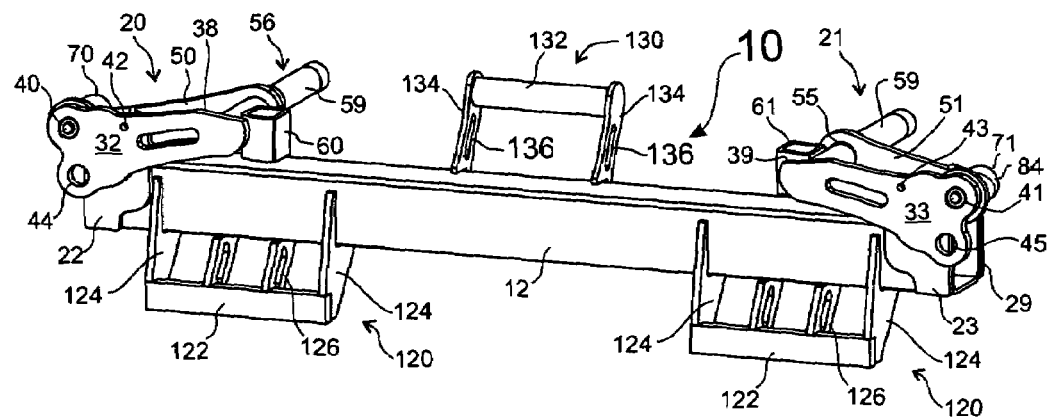
FIG. 2 is a perspective view of a towing dolly assembly 10.

Referring to FIGS. 1, 2, and 3, preferably each axle cradle assembly 120 comprises an axle cradle main support bar 122, having two identical axle cradle outer supports 124, the outer supports attached by welding to the bar with one outer support at each end of the bar, and two identical axle cradle inner supports 126, each inner support attached by welding to the bar and each inner support located along the bar and both inner supports bracketed between the two outer supports. Preferably, the assembled axle cradle assembly 120 is attached by welding to the main tube 12. Preferably, after attachment to the main tube 12, the axle cradle assembly 120 and portions of the main tube bracketed by the axle cradle assembly define three receiving openings in the axle cradle assembly each receiving opening sized to receive and retain an axle end attachment tab 302.

Referring to FIGS. 2 and 3, a dolly handle assembly 130 comprises a handle tube 132 attached by welding between two handle weldments 134, and the handle assembly is attached by welding to the main tube 12 preferably at or near the midpoint of the horizontal tube on longitudinal side of the main tube opposite and parallel to the side having the axle cradle assemblies 120 attached. Preferably, each handle weldment 134 has at least one tie down anchor 136. Preferably, each tie down anchor 136 is an aperture in the handle weldment sized to receive an end of a tie-down strap (not shown). The tie-down strap can be used with the tie down anchor 136 to secure a disabled vehicle to the towing dolly cradle assembly 8.

Figure 10:
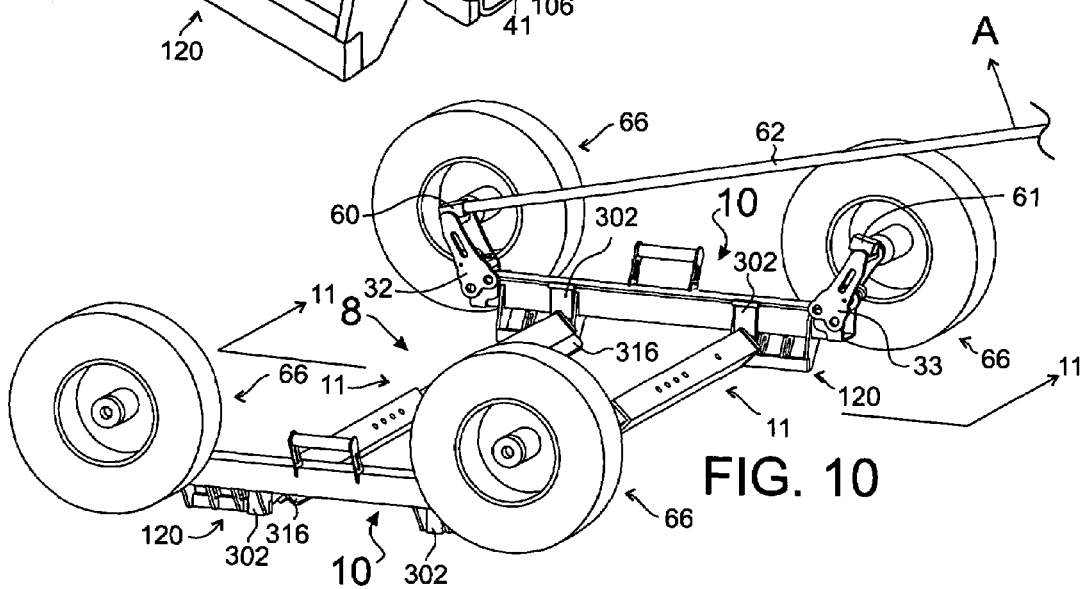
FIG. 10 is a perspective view of a towing dolly cradle assembly 8 with each pivot mounting assembly 20, 21 in a detent position.
Figure 11:
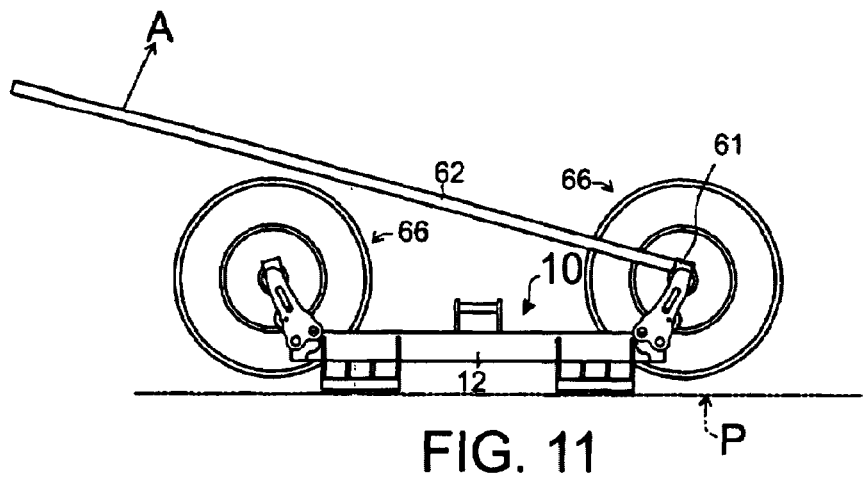
FIG. 11 is a side view of the towing dolly cradle assembly 8, along the view line 11-11 shown in FIG. 10, with the two dolly axle assemblies removed from the view and with the lever 62 moved from engagement in a left dolly pivot lever anchor 60 shown in FIG. 10 to engagement in a right dolly pivot lever anchor 61, showing each pivot mounting assembly 20, 21 in a detent position and showing a line indicating the general plane P of the ground surface at a recovery site under the towing dolly assembly 10 when placed on the ground as part of the cradle assembly.
Figure 12:
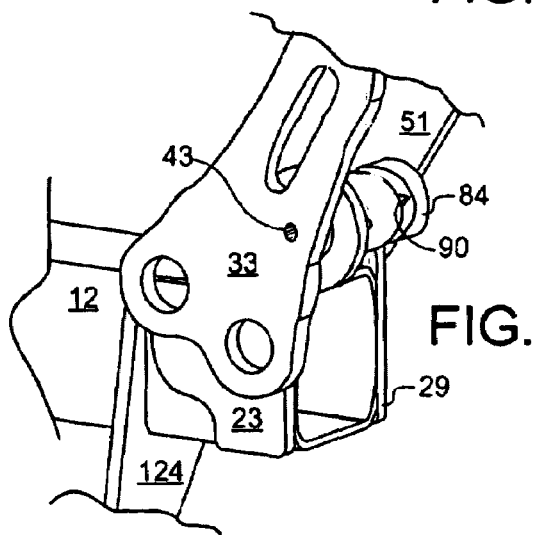
FIG. 12 is a partial perspective view of a towing dolly assembly 10 from above showing the right pivot mounting assembly 21 in a detent position and showing a camlock cap 84 in a partially open condition.
Figure 13:
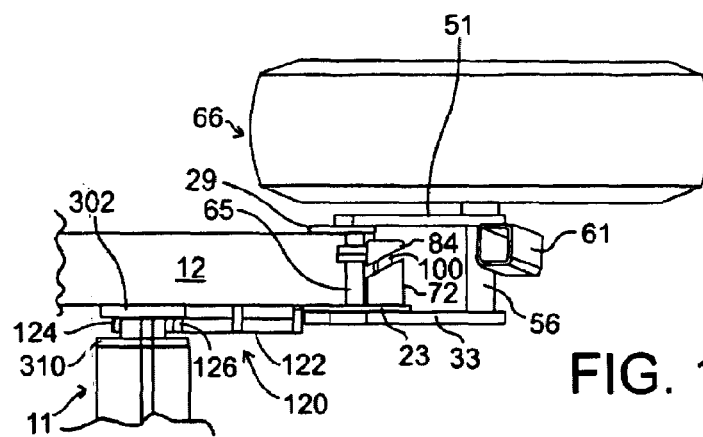
FIG. 13 is a partial top view of the towing dolly cradle assembly 8 showing an axle end attachment tab 302 of a dolly axle assembly 11 inserted into close engagement in a receiving opening in an axle cradle assembly 120.

An arrow A in FIGS. 10 and 11 indicates the direction of movement of a dolly lever 62 and an associated pivot mounting assembly 20 or 21 about the longitudinal axis of a spindle 56 from a detent position to a raised position.

Figure 14:
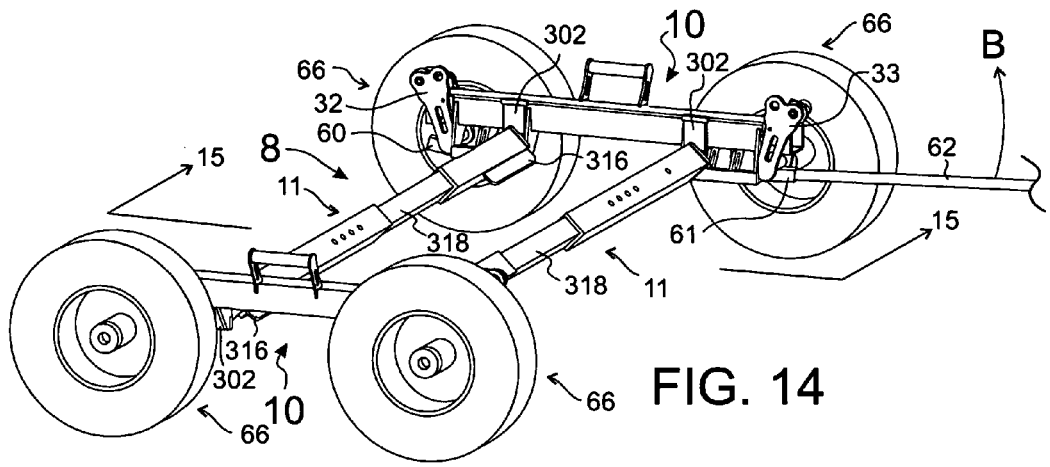
FIG. 14 is a perspective view of a towing dolly cradle assembly 8 with each pivot mounting assembly 20, 21 in a raised position.
Figure 15:
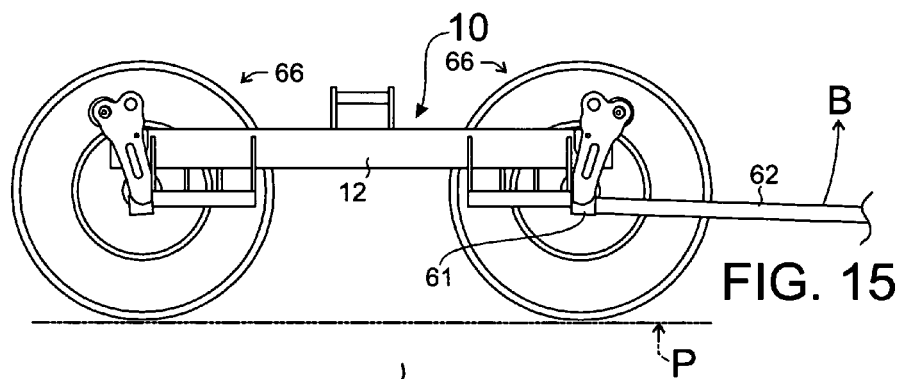
FIG. 15 is a side view of the towing dolly cradle assembly 8, along the view line 15-15 shown in FIG. 14, with the two dolly axle assemblies removed from the view, showing each pivot mounting assembly 20, 21 in a raised position above the general plane P of the recovery site and showing a dolly lever 62 engaged in a right dolly pivot lever anchor 61.
Figure 16:
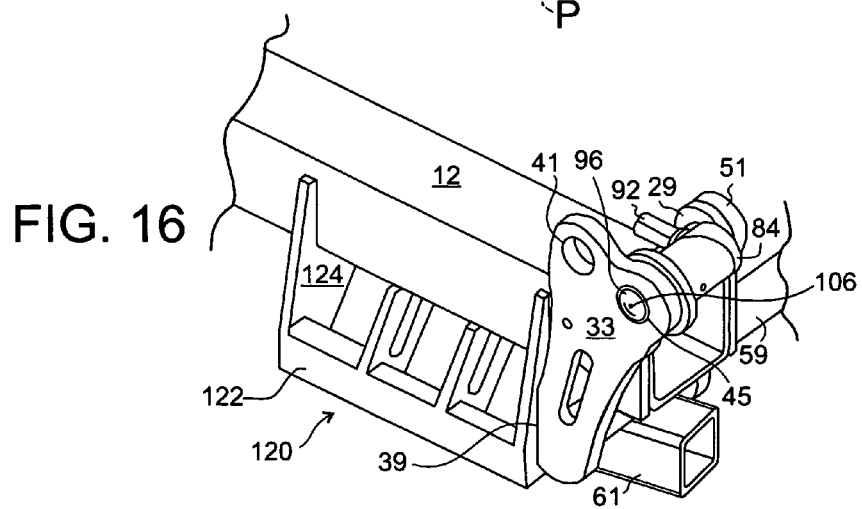
FIG. 16 is a partial perspective view of a towing dolly assembly 10 from above showing the right pivot mounting assembly 21 in a raised position and showing the camlock cap 84 in a closed condition with the camlock engaging pin 96 protruding into and engaging a camlock engaging pin raised position receiving hole 45 of a wheel pivot lock arm 33.
Figure 17:
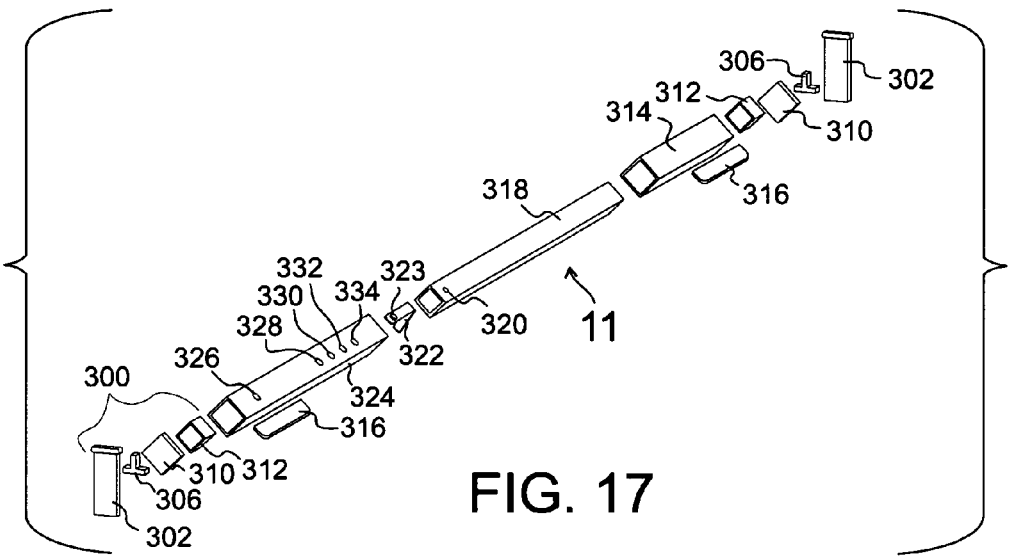
FIG. 17 is a perspective exploded view of a towing dolly axle assembly 11.
Figures 18, 19:
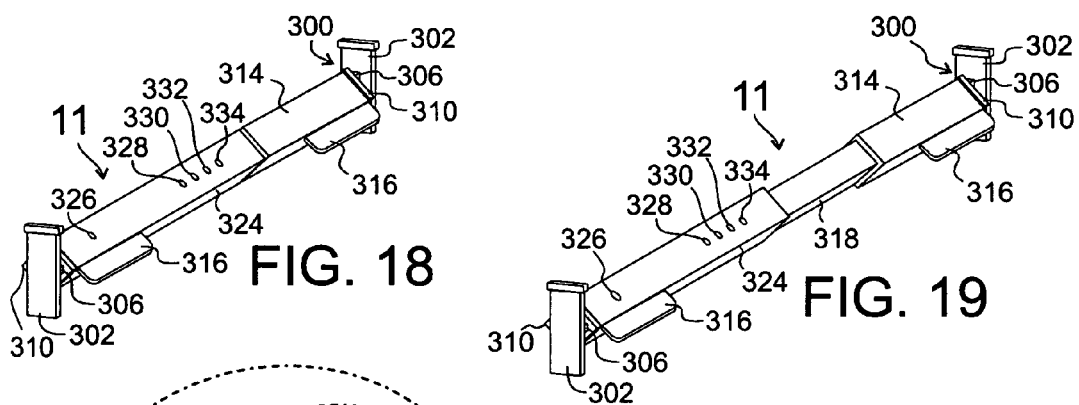
FIG. 18 is a perspective view of a telescoping towing dolly axle assembly 11 in a closed condition.
FIG. 19 is a perspective view of a telescoping towing dolly axle assembly 11 telescoped outwardly from a closed condition.
Figures 20, 21:
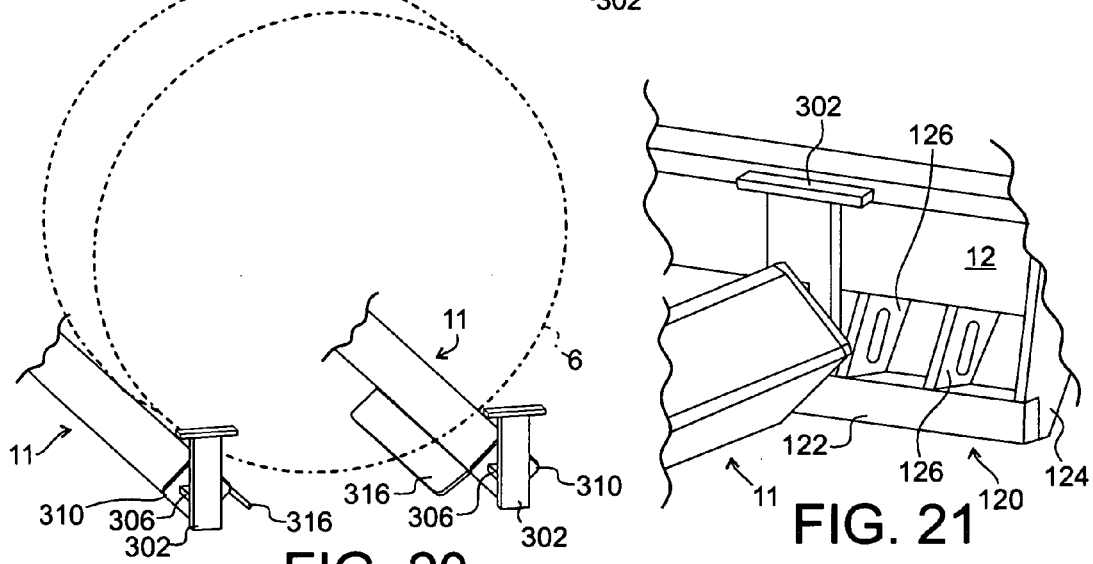
FIG. 20 is a partial, perspective view of two dolly axle assemblies 11 placed in close proximity and bracketing forward and rearward and lower portions of one of a pair of coaxial disabled vehicle wheels 6 of a disabled vehicle (not shown) at a stage during the assembly of the towing dolly cradle assembly in relationship to the disabled vehicle.
FIG. 21 is a partial, perspective view from above of an axle end attachment tab 302 inserted into close engagement in a receiving opening in an axle cradle assembly 120.

When a pivot mounting assembly 20, 21 is in the detent position and its associated camlock cap 84 is in a rotation position with associated angled faces spaced apart and parallel enabling a closed condition for an associated camlock assembly 70, 71, subsequent operation of a dolly lever 62 in direction of arrow A by a tow vehicle operator applies torque to the pivot mounting assembly 20, 21 via a respective dolly lever anchor 60, 61 and raises an associated end of the horizontal main tube 12 by rotating a respective associated pivot lock arm 32, 33 and its raised position receiving hole 44, 45 about the axis of a respective associated pivot pin 64, 65 to the raised position shown in FIGS. 14, 15, and 16 and the associated engaging pin 96 may snap, move, or otherwise engage the respective associated raised position receiving hole when aligned.

If an associated camlock assembly 70, 71 is in an open condition, such as shown in FIG. 7, an arrow B in FIGS. 14 and 15 indicates the direction of movement of a dolly lever 62 and an associated pivot mounting assembly 20 about the longitudinal axis of a spindle 56 from a raised position towards a detent position and towards a storage position.

When a dolly assembly 10 is in the raised position as shown in FIG. 15, operation of a dolly lever 62 in direction of arrow B by a tow vehicle operator after opening an associated camlock 70, 71 will apply torque to the pivot mounting assembly 20, 21 via the respective lever anchor 60, 61 and lower the associated end of the horizontal main tube 12 and rotate respective associated pivot arms 32 and 50 or 33 and 51 about the axis of a respective associated pivot pin 64 or 65 towards the detent position and towards the storage position.

A broken line P in FIGS. 11 and 15 illustrates generally the general plane of the surface of the ground beneath a towing dolly assembly 10 when on the ground at a typical recovery site.

The preceding description and exposition of the invention is presented for purposes of illustration and enabling disclosure. It is neither intended to be exhaustive nor to limit the invention to the precise forms disclosed. Modifications or variations in the invention in light of the above teachings that are obvious to one of ordinary skill in the art are considered within the scope of the invention as determined by the appended claims when interpreted to the breath to which they fairly, legitimately and equitably are entitled.

We claim:

1. A towing dolly cradle assembly comprising two towing dolly assemblies, each said dolly assembly having a horizontal main tube, each said main tube having a left end and a right end, a left pivot mounting assembly attached to said left end, a right pivot mounting assembly attached to said right end, each said main tube having two axle cradle assemblies spaced apart and attached along one longitudinal side of each said main tube between respective said left ends and said right ends, said dolly assemblies spaced apart parallel and facing opposite one another with said axle cradle assemblies facing one another, and two dolly axle assemblies spaced parallel apart and opposite one another, and each said axle assembly having a central assembly, each said central assembly comprising a fixed length tube having two ends and having attached to each said end an axle end attachment tab, said axle assemblies interposed perpendicularly between said dolly assemblies and having respective said axle end attachment tabs removably attached to respective said axle cradle assemblies of respective said dolly assemblies, wherein each said left pivot mounting assembly comprising a left camlock assembly, said left camlock assembly having a camlock engaging pin, a left camlock weldment attached to one longitudinal, vertical side of said main tube proximate said left end, said left camlock weldment having a left camlock weldment pivot pin bore spaced from and parallel to a left camlock mounting bore, said left camlock assembly mounted to said left camlock weldment above and transversely across said main tube with said camlock engaging pin coaxial to said left camlock mounting bore and selectively moveable in, through, and outward beyond said left camlock mounting bore, a left pivot weldment, said left pivot weldment spaced parallel and across said main tube from said left camlock weldment and attached to the opposite longitudinal side of said main tube, and said left pivot weldment having a left pivot weldment pivot pin bore coaxial to said left camlock weldment pivot pin bore, a left pivot pin having two extending ends, said left pivot pin extending coaxially through said left camlock weldment pivot pin bore and extending transversely and perpendicularly across the longitudinal axis of said main tube and extending coaxially through said left pivot weldment pivot pin bore, said left pivot pin rotatably retained within said left camlock weldment pivot pin bore and said left pivot weldment pivot pin bore, a left pivot lock arm attached perpendicularly to a first extending end of said left pivot pin adjacent to said left camlock weldment, a left pivot arm attached perpendicularly to a second extending end of said left pivot pin adjacent to said left pivot weldment, said left pivot arm having a left spindle mounting hole spaced from and parallel to said left pivot pin, a wheel spindle attached at one end perpendicularly to said left pivot lock arm and spaced from and parallel to said left pivot pin at a distance sufficient to allow said left spindle to swing about the left pivot pin in an arc beyond said right end and beneath said main tube, and said wheel spindle mounted to said left pivot arm in and through said left spindle mounting hole and said wheel spindle having a wheel spindle stub axle portion extending outwardly and perpendicularly beyond said left pivot arm and away from said main tube and parallel to said left pivot pin, and said left pivot lock arm having a left raised position receiving hole transverse through said left pivot lock arm spaced from and parallel to said left pivot pin and located through said left pivot arm in a position that selectively and coaxially aligns with said camlock engaging pin to selectively engage said left raised position receiving hole when said left wheel spindle is located below said main tube and approximately 18 degrees over center towards the longitudinal midpoint of the underside of said main tube, said raised position receiving hole sized to selectively and coaxially receive said camlock engaging pin of said left camlock assembly, a left dolly pivot lever anchor attached to said wheel spindle and located between said left pivot lock arm and said left pivot arm, and wherein each said right pivot mounting assembly comprising a right camlock assembly, said right camlock assembly having a camlock engaging pin, a right camlock weldment attached to said same longitudinal, vertical side of said main tube as attached to said left camlock weldment, and said right camlock weldment attached proximate said right end, said right camlock weldment having a right camlock weldment pivot pin bore spaced from and parallel to a right camlock mounting bore, said right camlock assembly mounted to said right camlock weldment above and transversely across said main tube with said camlock engaging pin coaxial to said right camlock mounting bore and selectively moveable in, through, and outward beyond said right camlock mounting bore, a right pivot weldment, said right pivot weldment spaced parallel and across said main tube from said right camlock weldment and attached to the opposite longitudinal side of said main tube, and said right pivot weldment having a right pivot weldment pivot pin bore coaxial to said right camlock weldment pivot pin bore, a right pivot pin having two extending ends, said right pivot pin extending coaxially through said right camlock weldment pivot pin bore and extending transversely and perpendicularly across the longitudinal axis of said main tube and extending coaxially through said right pivot weldment pivot pin bore, said right pivot pin rotatably retained within said right camlock weldment pivot pin bore and said right pivot weldment pivot pin bore, a right pivot lock arm attached perpendicularly to a first extending end of said right pivot pin adjacent to said right camlock weldment, a right pivot arm attached perpendicularly to a second extending end of said right pivot pin adjacent to said right pivot weldment, said right pivot arm having a right spindle mounting hole spaced from and parallel to said right pivot pin, a wheel spindle attached at one end perpendicularly to said right pivot lock arm and spaced from and parallel to said right pivot pin at a distance sufficient to allow said right spindle to swing about the right pivot pin in an arc beyond said right end and beneath said main tube, and said wheel spindle mounted to said right pivot arm in and through said right spindle mounting hole and said wheel spindle having a wheel spindle stub axle portion extending outwardly and perpendicularly beyond said right pivot arm and away from said main tube and parallel to said right pivot pin, and said right pivot lock arm having a right raised position receiving hole transverse through said right pivot lock arm spaced from and parallel to said right pivot pin and located through said right pivot arm in a position that selectively and coaxially aligns with said camlock engaging pin to selectively engage said right raised position receiving hole when said right wheel spindle is located below said main tube and approximately 18 degrees over center towards the longitudinal midpoint of the underside of said main tube, said raised position receiving hole sized to selectively and coaxially receive said camlock engaging pin of said right camlock assembly, a right dolly pivot lever anchor attached to said wheel spindle and located between said right pivot lock arm and said right pivot arm, and wherein each said towing dolly assembly further comprising two wheel assemblies with one said wheel assembly mounted to and rotatably retained on each said spindle stub axle portion.

2. A towing dolly cradle assembly according to claim 1 wherein each said left pivot lock arm further having a left detent position receiving hole spaced from said left pivot pin at the same distance as said left raised position receiving hole and spaced angularly around the axis of said left pivot pin away from said left raised position receiving hole, wherein each said right pivot lock arm further having a right detent position receiving hole spaced from said right pivot pin at the same distance as said right raised position receiving hole and spaced angularly around the axis of said right pivot pin away from said right raised position receiving hole, and wherein each said camlock engaging pin further having a camlock engaging pin nub on the outer end of said camlock engaging pin sized to be resiliently received in said detent position receiving holes.

3. A towing dolly cradle assembly according to claim 1 wherein each said left pivot lock arm further having a left storage position receiving hole transverse through said left pivot lock arm and located through said left pivot lock arm in a position that coaxially aligns with said left camlock engaging pin to selectively engage said left storage position receiving hole when said left wheel spindle is located above and near the upper side of said main tube, and said storage position receiving hole sized to selectively and coaxially receive said camlock engaging pin of said left camlock, and wherein each said right pivot lock arm further having a right storage position receiving hole transverse through said right pivot lock arm and located through said right pivot lock arm in a position that coaxially aligns with said right camlock engaging pin to selectively engage said right storage position receiving hole when said right wheel spindle is located above and near the upper side of said main tube, and said storage position receiving hole sized to selectively and coaxially receive said camlock engaging pin of said right camlock.

4. A towing dolly cradle assembly comprising two towing dolly assemblies, each said dolly assembly having a horizontal main tube, each said main tube having a left end and a right end, a left pivot mounting assembly attached to said left end, a right pivot mounting assembly attached to said right end, each said main tube having two axle cradle assemblies spaced apart and attached along one longitudinal side of each said main tube between respective said left ends and said right ends, said dolly assemblies spaced apart parallel and facing opposite one another with said axle cradle assemblies facing one another, and two dolly axle assemblies spaced parallel apart and opposite one another, and each said axle assembly having a central assembly, each said central assembly comprising a telescoping axle tube assembly having an axle end attachment tab at each end, said axle assemblies interposed perpendicularly between said dolly assemblies and having respective said axle end attachment tabs removably attached to respective said axle cradle assemblies of respective said dolly assemblies, wherein each said left pivot mounting assembly comprising a left camlock assembly, said left camlock assembly having a camlock engaging pin, a left camlock weldment attached to one longitudinal, vertical side of said main tube proximate said left end, said left camlock weldment having a left camlock weldment pivot pin bore spaced from and parallel to a left camlock mounting bore, said left camlock assembly mounted to said left camlock weldment above and transversely across said main tube with said camlock engaging pin coaxial to said left camlock mounting bore and selectively moveable in, through, and outward beyond said left camlock mounting bore, a left pivot weldment, said left pivot weldment spaced parallel and across said main tube from said left camlock weldment and attached to the opposite longitudinal side of said main tube, and said left pivot weldment having a left pivot weldment pivot pin bore coaxial to said left camlock weldment pivot pin bore, a left pivot pin having two extending ends, said left pivot pin extending coaxially through said left camlock weldment pivot pin bore and extending transversely and perpendicularly across the longitudinal axis of said main tube and extending coaxially through said left pivot weldment pivot pin bore, said left pivot pin rotatably retained within said left camlock weldment pivot pin bore and said left pivot weldment pivot pin bore, a left pivot lock arm attached perpendicularly to a first extending end of said left pivot pin adjacent to said left camlock weldment, a left pivot arm attached perpendicularly to a second extending end of said left pivot pin adjacent to said left pivot weldment, said left pivot arm having a left spindle mounting hole spaced from and parallel to said left pivot pin, a wheel spindle attached at one end perpendicularly to said left pivot lock arm and spaced from and parallel to said left pivot pin at a distance sufficient to allow said left spindle to swing about the left pivot pin in an arc beyond said right end and beneath said main tube, and said wheel spindle mounted to said left pivot arm in and through said left spindle mounting hole and said wheel spindle having a wheel spindle stub axle portion extending outwardly and perpendicularly beyond said left pivot arm and away from said main tube and parallel to said left pivot pin, and said left pivot lock arm having a left raised position receiving hole transverse through said left pivot lock arm spaced from and parallel to said left pivot pin and located through said left pivot arm in a position that selectively and coaxially aligns with said camlock engaging pin to selectively engage said left raised position receiving hole when said left wheel spindle is located below said main tube and approximately 18 degrees over center towards the longitudinal midpoint of the underside of said main tube, said raised position receiving hole sized to selectively and coaxially receive said camlock engaging pin of said left camlock assembly, a left dolly pivot lever anchor attached to said wheel spindle and located between said left pivot lock arm and said left pivot arm, and wherein each said right pivot mounting assembly comprising a right camlock assembly, said right camlock assembly having a camlock engaging pin, a right camlock weldment attached to one longitudinal, vertical side of said main tube proximate said right end, said right camlock weldment having a right camlock weldment pivot pin bore spaced from and parallel to a right camlock mounting bore, said right camlock assembly mounted to said right camlock weldment above and transversely across said main tube with said camlock engaging pin coaxial to said right camlock mounting bore and selectively moveable in, through, and outward beyond said right camlock mounting bore, a right pivot weldment, said right pivot weldment spaced parallel and across said main tube from said right camlock weldment and attached to the opposite longitudinal side of said main tube, and said right pivot weldment having a right pivot weldment pivot pin bore coaxial to said right camlock weldment pivot pin bore, a right pivot pin having two extending ends, said right pivot pin extending coaxially through said right camlock weldment pivot pin bore and extending transversely and perpendicularly across the longitudinal axis of said main tube and extending coaxially through said right pivot weldment pivot pin bore, said right pivot pin rotatably retained within said right camlock weldment pivot pin bore and said right pivot weldment pivot pin bore, a right pivot lock arm attached perpendicularly to a first extending end of said right pivot pin adjacent to said right camlock weldment, a right pivot arm attached perpendicularly to a second extending end of said right pivot pin adjacent to said right pivot weldment, said right pivot arm having a right spindle mounting hole spaced from and parallel to said right pivot pin, a wheel spindle attached at one end perpendicularly to said right pivot lock arm and spaced from and parallel to said right pivot pin at a distance sufficient to allow said right spindle to swing about the right pivot pin in an arc beyond said right end and beneath said main tube, and said wheel spindle mounted to said right pivot arm in and through said right spindle mounting hole and said wheel spindle having a wheel spindle stub axle portion extending outwardly and perpendicularly beyond said right pivot arm and away from said main tube and parallel to said right pivot pin, and said right pivot lock arm having a right raised position receiving hole transverse through said right pivot lock arm spaced from and parallel to said right pivot pin and located through said right pivot arm in a position that selectively and coaxially aligns with said camlock engaging pin to selectively engage said right raised position receiving hole when said right wheel spindle is located below said main tube and approximately 18 degrees over center towards the longitudinal midpoint of the underside of said main tube, said raised position receiving hole sized to selectively and coaxially receive said camlock engaging pin of said right camlock assembly, a right dolly pivot lever anchor attached to said wheel spindle and located between said right pivot lock arm and said right pivot arm, and wherein each said towing dolly assembly further comprising two wheel assemblies with one said wheel assembly mounted to and rotatably retained on each said spindle stub axle portion.

5. A towing dolly cradle assembly according to claim 4 wherein each said left pivot lock arm further having a left detent position receiving hole spaced from said left pivot pin at the same distance as said left raised position receiving hole and spaced angularly around the axis of said left pivot pin away from said left raised position receiving hole, wherein each said right pivot lock arm further having a right detent position receiving hole spaced from said right pivot pin at the same distance as said right raised position receiving hole and spaced angularly around the axis of said right pivot pin away from said right raised position receiving hole, and wherein each said camlock engaging pin further having a camlock engaging pin nub on the outer end of said camlock engaging pin sized to be resiliently received in said detent position receiving holes.

6. A towing dolly cradle assembly according to claim 5 wherein each said left pivot lock arm further having a left storage position receiving hole transverse through said left pivot lock arm and located through said left pivot lock arm in a position that coaxially aligns with said left camlock engaging pin to selectively engage said left storage position receiving hole when said left wheel spindle is located above and near the upper side of said main tube, and said storage position receiving hole sized to selectively and coaxially receive said camlock engaging pin of said left camlock, and wherein each said right pivot lock arm further having a right storage position receiving hole transverse through said right pivot lock arm and located through said right pivot lock arm in a position that coaxially aligns with said right camlock engaging pin to selectively engage said right storage position receiving hole when said right wheel spindle is located above and near the upper side of said main tube, and said storage position receiving hole sized to selectively and coaxially receive said camlock engaging pin of said right camlock.

7. A towing dolly cradle assembly according to claim 5 wherein each said telescoping axle tube assembly having an axle end attachment tab attached to an axle end spacer, said end spacer attached to an axle end plate, said end plate attached to an axle end plug, said plug inserted into and attached to one end of a first outer axle tube, a portion of an inner axle tube inserted within and attached to said first outer tube, said inner axle tube having a snap button mounting bore through one wall and said inner tube having a snap button engagement nub operatively seated in said snap button mounting bore, said engagement nub biased under spring pressure and extending through said wall of said inner tube, a second outer axle tube adjustably received over a free end of said inner tube, said second outer axle tube having a plurality of snap button receiving bores located along a wall of said second outer tube to operatively and selectively receive and releasably secure said second outer tube to said inner tube, said second outer tube attached at its end away from said inner tube to a second axle end plug, said second end plug attached to a second axle end plate, said second axle end plate attached to a second axle end spacer, and said second end spacer attached to a second axle end attachment tab.

8. A towing dolly cradle assembly according to claim 5 wherein each said telescoping axle tube assembly comprising an inner axle tube having a first inner axle tube end and a second inner axle tube end, a first axle end attachment tab attached to said first inner axle tube end, said inner axle tube having a snap button mounting bore through one inner axle tube wall near said second inner axle tube end, a snap button having a snap button engagement nub operatively seated from within said inner axle tube in said snap button mounting bore, said snap button engagement nub selectively extending through and beyond said snap button mounting bore, an outer axle tube having a first outer axle tube end and a second outer axle tube end, said second inner axle tube end inserted into said first outer axle tube end and slidingly and adjustably received within said first outer axle tube end, said outer axle tube having a plurality of snap button receiving bores selectively distributed along the length of one outer axle tube wall to operatively and selectively receive said snap button engagement nub and releasably and selectively secure said outer axle tube to said inner axle tube, and said second outer axle tube end attached to a second axle end attachment tab.

9. A towing dolly cradle assembly according to claim 4 wherein each said telescoping axle tube assembly having an axle end attachment tab attached to an axle end spacer, said end spacer attached to an axle end plate, said end plate attached to an axle end plug, said plug inserted into and attached to one end of a first outer axle tube, a portion of an inner axle tube inserted within and attached to said first outer tube, said inner axle tube having a snap button mounting bore through one wall and said inner tube having a snap button engagement nub operatively seated in said snap button mounting bore, said engagement nub biased under spring pressure and extending through said wall of said inner tube, a second outer axle tube adjustably received over a free end of said inner tube, said second outer axle tube having a plurality of snap button receiving bores located along a wall of said second outer tube to operatively and selectively receive and releasably secure said second outer tube to said inner tube, said second outer tube attached at its end away from said inner tube to a second axle end plug, said second end plug attached to a second axle end plate, said second axle end plate attached to a second axle end spacer, and said second end spacer attached to a second axle end attachment tab.

10. A towing dolly cradle assembly according to claim 4 wherein each said telescoping axle tube assembly comprising an inner axle tube having a first inner axle tube end and a second inner axle tube end, a first axle end attachment tab attached to said first inner axle tube end, said inner axle tube having a snap button mounting bore through one inner axle tube wall near said second inner axle tube end, a snap button having a snap button engagement nub operatively seated from within said inner axle tube in said snap button mounting bore, said snap button engagement nub selectively extending through and beyond said snap button mounting bore, an outer axle tube having a first outer axle tube end and a second outer axle tube end, said second inner axle tube end inserted into said first outer axle tube end and slidingly and adjustably received within said first outer axle tube end, said outer axle tube having a plurality of snap button receiving bores selectively distributed along the length of one outer axle tube wall to operatively and selectively receive said snap button engagement nub and releasably and selectively secure said outer axle tube to said inner axle tube, and said second outer axle tube end attached to a second axle end attachment tab.

\* \* \* \* \*